United States Patent Office 3,664,582
Patented May 23, 1972

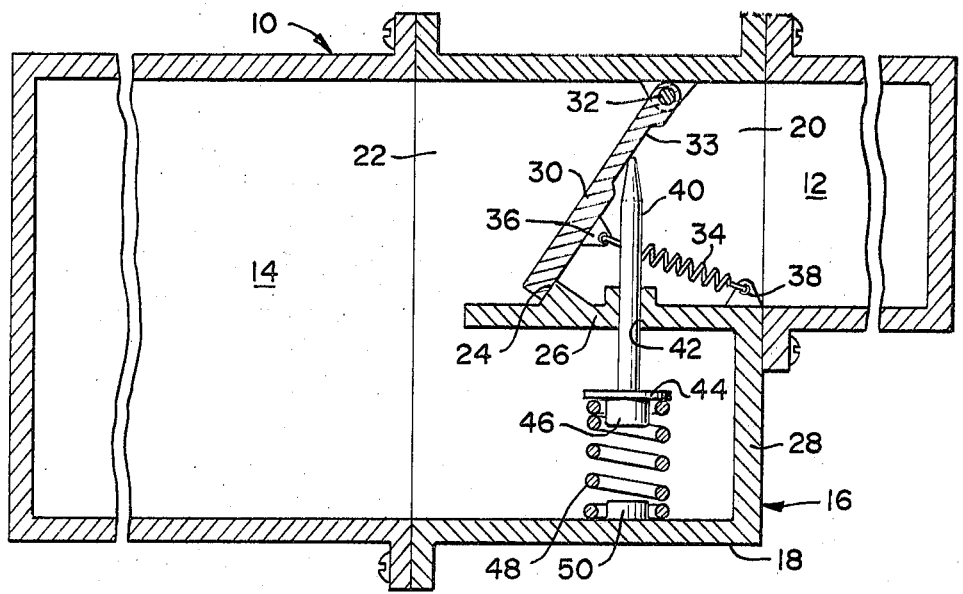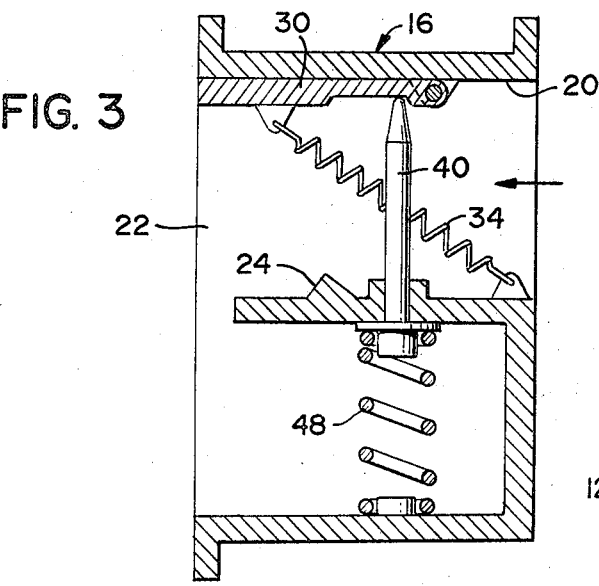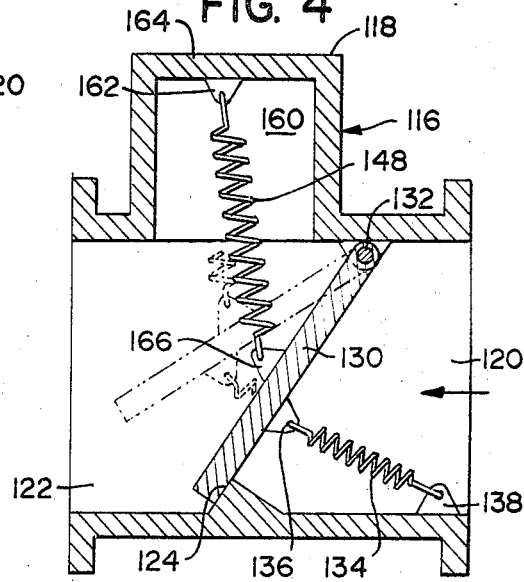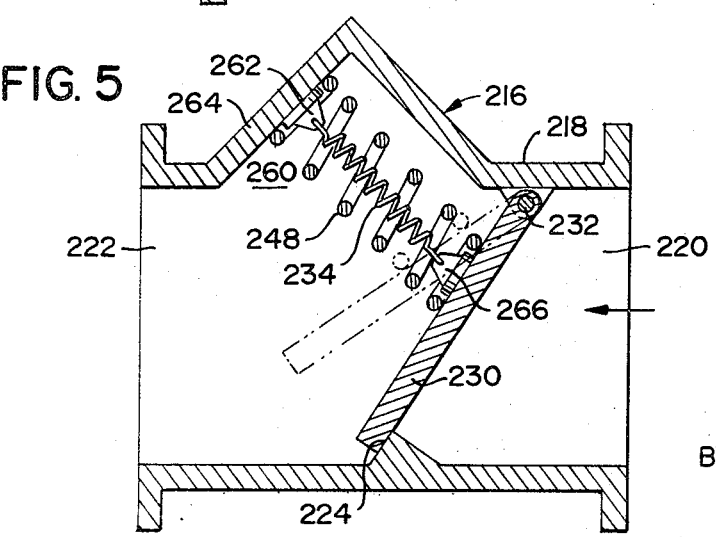

3,664,582
NON-LINEAR TEMPERATURE RESPONSIVE
VALVE ASSEMBLIES
Wilbur F. Jackson, Rolling Hills, and James R. Willson, Garden Grove, Calif., assignors to Robertshaw Controls Company, Richmond, Va.
Filed Oct. 29, 1969, Ser. No. 872,088
Int. Cl. G05d 23/02
U.S. Cl. 236—93
20 Claims

ABSTRACT OF THE DISCLOSURE

A temperature responsive valve assembly including an inlet, an outlet and a valve member mounted therebetween and adapted to be positioned by an operator member constructed of a material having a temperature-actuated shape memory. The operator member is located adjacent the downstream side of the valve assembly whereby fluid flow therethrough is regulated in relation to downstream fluid temperature. The particular actuating temperature of the operator member can be fixed or can be adjusted as by varying the stress applied thereto by springs.

BACKGROUND OF THE INVENTION

Field of the invention

The present invention pertains generally to temperature responsive control valves, and more particularly, to such devices utilizing an operator member constructed of a material having a temperature-actuated shape memory.

Description of the prior art

Various types of temperature responsive valve assemblies have been used in the past to regulate the amount of fluid, such as heated or cooled air, flowing into a compartment for maintaining such compartment within a predetermined temperature range. Such assemblies typically employ operators such as bimetals, hydraulic bulbs and bellows, and expansible rods and tubes; however, all of these conventional operators have a common disadvantage in their inability to perform the mechanical work required to operate associated valve members with the small amount of input energy normally supplied by way of heat. Furthermore, such operators are incapable of providing more than a small amount of movement over a given temperature range, and as a result, provide inefficient operation. In addition, conventional temperature responsive operators have invariable shapes and cross sections and are not adaptable to new and varying valve structures.

Conventional temperature responsive valve operators operate primarily by expansion and contraction. That is, in the case of a bimetal the varying thermal coefficient of expansion of the two strips of metal secured to each other causes deflection of the bimetal, and in the case of a rod and tube, the rod is constructed of a metal having a low coefficient of expansion and is secured at one end to the tube which has a much higher coefficient of expansion such that the rod is moved by the tube in response to temperature.

Since conventional temperature responsive valve operators operate due to expansion and contraction of materials, they require ambient temperature compensation when used to regulate fluid flow therethrough in relation to temperature in order to prevent faulty and inaccurate operation. Complete ambient temperature compensation is difficult to provide, and accordingly, the need for such compensation is a distinct disadvantage.

SUMMARY OF THE INVENTION

The present invention is summarized in that a temperature responsive valve assembly includes a casing having an inlet port and an outlet port, a valve mounted within the casing and having first and second fluid flow control positions to regulate a flow of fluid therethrough, and a bias spring mounted between the valve and the casing for exerting a force on the valve; an actuator means is mounted on the casing adjacent the outlet port to apply a force to the valve opposing the force exerted by the bias spring to control the position of the valve, the actuator means including an operator member constructed of a material having a temperature-actuated shape memory and exhibiting a rapid transformation between an initial shape and a distorted shape within a predetermined transition temperature zone whereby the valve is rapidly moved between the first and second fluid flow control positions in response to downstream fluid temperature.

It is an object of the present invention to construct an operator for a fluid temperature regulating valve assembly of a material having a temperature-actuated shape memory.

Another object of the present invention is to utilize an operator member constructed of a material having a temperature-actuated shape memory to control a valve member in response to sensed temperature of fluid adjacent the downstream side of the valve member.

The present invention has a further object in that a member constructed of a material having a temperature-actuated shape memory is utilized to regulate the temperature of fluid within a compartment by controlling fluid flow thereto through a valve.

Valve operators constructed in accordance with the present invention are advantageous over conventional valve operators in that a high work output is obtained for the amount of energy supplied to the valve operators by way of temperature change, the valve operators are capable of a large amount of movement in response to temperature fluctuations, and calibration is inherently provided thereby obviating ambient temperature compensation.

Other objects and advantages of the present invention will become more fully apparent from the following detailed description of the preferred embodiments of the invention when considered in conjunction with the accompanying drawings.

BRIEF DESCRIPTION OF THE DRAWINGS

FIG. 2 is a vertical cross-section of a refrigerator embodying a valve assembly of the present invention;

FIG. 3 is a vertical cross-section of the valve assembly detail of FIG. 2 is another position;

FIG. 4 is a vertical cross-section of another embodiment of the valve assembly detail of the present invention;

FIG. 5 is a vertical cross-section of a further embodiment of the valve assembly detail of the present invention.

DESCRIPTION OF THE PREFERRED EMBODIMENTS

All of the embodiments of the present invention utilize operator members constructed from a material having a temperature-actuated shape memory characterized by a martensitic type transformation occurring at a transition or critical temperature. Such material will retain its deformed or distorted shape when bent or contorted below its transition temperature, but when the deformed material is heated above the transition point with nothing constraining its movement, it will spring back to its initial configuration and, as a result, perform work.

Figure 1:
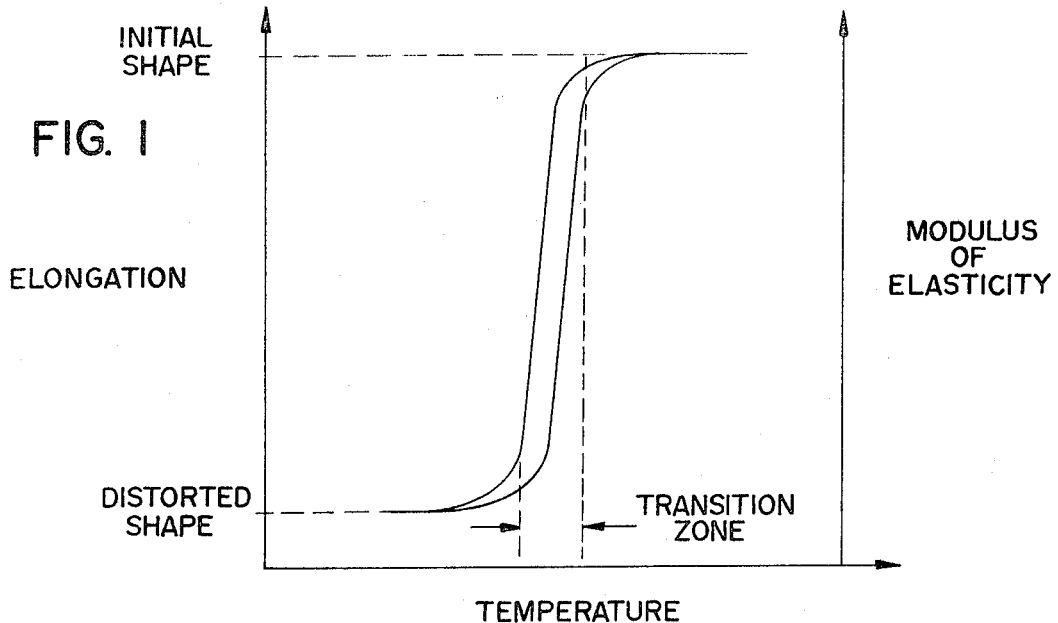
FIG. 1 is a modulus of elasticity vs. temperature, and elongation vs. temperature curve descriptive of the general operation of operator members constructed of a material having a temperature-actuated shape memory.

Referring to FIG. 1, the transition temperature is represented by a rapid change in modulus on a modulus of elasticity vs. temperature hysteresis curve. That is, as temperature decreases through the transition zone, the modulus of elasticity rapidly decreases, and similarly, as temperature increases through the transition zone, the modulus of elasticity rapidly increases.

As illustrated by the left vertical scale in FIG. 1, control members having temperature-actuated shape memory exhibit deflection characteristics on an elongation vs. temperature curve which are generally proportional to the variations in modulus of elasticity when such members are used to perform work against a load. It is this unusual characteristic which enables rapid control or modulation of fluid flow through a temperature responsive valve assembly operating about the transition zone and constructed in accordance with the present invention. In other words, the rapid deflection of operator members constructed of such materials as the transition temperature zone is traversed produces rapid flow regulation to minimize the time lag between sensed fluid temperature and fluid flow control.

For the purposes of the invention of this disclosure, material having a transition temperature centered about the intended operating point should be used. This will allow the shape memory material to undergo its martensitic type transition when used at normal operating ambient temperature. These operating ambients may be greater than, less than, or equal to room temperatures depending upon the particular installation contemplated.

The above description of materials useful with the present invention is provided for general background in order to aid in understanding the present invention. For specific information with respect to one such material, reference is made to U.S. Pat. No. 3,174,851 and U.S. Pat. No. 3,403,238. The above cited patents are concerned with alloys formed of nickel and titanium; however, while an alloy having a composition of approximately 55 percent nickel by weight with the remainder being essentially titanium may be used with the present invention, it should be noted that a similar material having a temperature-actuated shape memory or a modulus of elasticity that varies with temperature may also be utilized.

For purposes of clarity in the description of the preferred embodiments, the shape assumed by a loaded operator member at a temperature above the transition temperature will be referred to as the initial shape and the shape assumed by the loaded operator member at a temperature below the transition temperature will be referred to as the distorted shape.

The present invention has a first embodiment in a two compartment refrigerator indicated generally at 10 in FIG. 2 having a first compartment 12 for supplying cold air from a cold source (not shown) to a second compartment 14. Interposed between compartments 12 and 14 is a temperature responsive valve assembly indicated generally at 16 including a casing 18 having an inlet 20 leading from compartment 12, an outlet 22 leading to compartment 14 and a damper valve seat 24, having a generally triangular cross-section, mounted therebetween. Valve seat 24 is formed upon the upper surface of a horizontal partition 26 which divides the valve assembly into upper and lower sections, the lower section being closed at the upstream side of the valve assembly by a side wall 28 so as to form a generally rectangular chamber open adjacent outlet 22. A movable valve element or damper plate 30 is disposed between inlet 20 and outlet 22 in the upper section of the casing 18 and is mounted for pivotal movement upon a hinge member 32 between a closed position (FIG. 2) and an open position (FIG. 3) for regulating fluidic flow therethrough.

A depression 33 in the lower surface of plate 30 may optionally be provided for engaging a connecting link, to be more fully described below. Plate 30 is normally constrained to its closed position, as illustrated in FIG. 2, under the force exerted by a biasing spring 34 mounted in tension between an eyelet 36 on the underside of damper plate 30 and an eyelet 38 located adjacent the inlet 20 of the valve assembly.

A cylindrical plunger or connecting link 40 is slidably mounted within a journaled aperture 42 in the partition 26 and has a preferably tapered upper end engaging damper plate 30 and a lower end extending into the lower chamber of casing 18. Formed upon the lower end of link 40 is an annular plate 44 having a downwardly protruding cylindrical hub 46 centrally disposed thereon for positioning the upper end of an operator member 48 which is mounted in compression between the link 40 and the casing 18 at nub 50. Operator member 48 is located within the lower chamber of casing 18 and thus is adapted to sense the temperature of air at the downstream side of the valve assembly.

The operator member is constructed of a material having a temperature actuated shape memory and, as illustrated, is helically formed but may assume any one of a number of shapes and cross sections, such as flat bars, rods, torsion bars, flat springs, wave washers, spring washers, Belleville springs, hair springs, helical springs, or wires to name a few, depending upon the particular operational characteristics desired for various specific applications.

In operation, helical operator member 48 is annealed above its transition temperature such that it has a loosely coiled initial shape as illustrated in FIG. 3 and a tightly coiled distorted shape as illustrated in FIG. 2.

As seen in FIG. 2, biasing spring 34 exerts a force upon damper plate 30 which tends to rotate the damper about hinge 32 against the upper end of connecting link 40. As a result, link 110 is downwardly biased so as to place operator member 48 in compression. Since operator member 48 has a low modulus of elasticity at temperatures below its transition temperature, it will assume its tightly coiled distorted shape under the force of spring 34 when its temperature is low. Thus, the distorted shape of operator member 48 in FIG. 2 will occur when the temperature of air in compartment 14, which surrounds control member 48, is below the transition temperature. In this manner, additional cold air from compartment 12 is blocked from passage through the valve assembly as damper plate 30 is held in sealed engagement with valve seat 24 by spring 34.

As heat enters compartment 14, by conduction through the walls thereof, for example, the air temperature therein will increase to the point where the temperature of operator member 48 is above the transition zone. As a consequence, the modulus of elasticity of the operator member increases and the operator member tries to return to its annealed shape. The martensitic type transition thus enables the operator member to exert a force which overcomes the biasing force applied by spring 34 and moves connecting link 40 up to open the damper 30 as shown in FIG. 3. Cold air from compartment 12 thereafter flows through the valve assembly wherein it circulates with the warmed air in compartment 14 to reduce its temperature to within the desired operational limits.

As the cold air passes through the valve assembly, the downstream temperature is sensed by operator member 48 due to the outlet opening of the lower section of the casing 18 in which the operator member is mounted. When enough cold air has entered compartment 14 to lower its temperature to the proper point, the temperature of operator member 48 will have dropped below its transition temperature and, consequently, will have produced a reduction in modulus of elasticity. Under these conditions, the force exerted by the helical operator member 48 will again be insufficient to overcome the biasing force of spring 34 and the damper 30 will colse to inhibit further influx of cold air.

The operator member is cylically contorted in this manner between its initial shape and its distorted shape to open and close the damper 30 in response to sensed air temperature downstream of valve seat 24 of the valve assembly. It should be understood, of course, that while operator memebr 48 has been shown and described as being a helical coil, numerous other configurations may be used depending upon the particular application contemplated.

A second embodiment of the valve assembly of the present invention for use with compartments 12 and 14 of refrigerator 10 is shown in FIG. 4 wherein parts similar to part in FIGS. 2 and 3 are given reference numbers with 100 added thereto.

A temperature responsive valve assembly 116 includes a casing 118 having an inlet 120, an outlet 122, and a generally triangular damper valve seat 124 disposed therebetween and formed upon the inner surface of a lower wall of casing 118. An upper wall of the casing defines an inwardly directed generally rectangular recess 160 having an eyelet 162 centrally affixed to a horizontal wall portion 164. Recess 160 is constructed to accommodate at least a portion of an operator memebr 148 formed from a material having temperature-actuated shape memory and having one end affixed to eyelet 162 and its other end affixed to an eyelet 166 mounted at about the center of the upper surface of a damper plate 130. Damper plate 130 is mounted at hinge member 132 for rotation and is normally constrained to a closed position against valve seat 124 by a biasing spring 134 held in tention between eyelet 136 on damper 130 and eyelet 138 on the casing 118.

In the embodiment of FIG. 4, operator member 148 is annealed above its transition temperature such that it has a tightly coiled initial shape and a loosely coiled distorted shape.

As illustrated, damper plate 130 will be closed against valve seat 124 when the operator member is in its loosely coiled distorted shape. This follows from the fact that biasing spring 134 acts to apply a stretching force to operator member 148 so that when a low modulus of elasticity is exhibited thereby, the spring force will contort the operating member to its distorted shape and, as a result, will close the damper 130. In other words, when the temperature of the operator member is below its transition point, its modulus of elasticity will be low and the force of bias spring 134 will stretch the operator member and close the damper 130.

As the temperature of the air surrounding operator member 148 becomes heated to a point above the transition temperature, the valve assembly opens as a result of the shape memory of the operator member which causes it to try to return to its tightly coiled annealed shape; the open position of operator member 148, damper 130 and biasing spring 134 is shown in dashed lines in FIG. 4. It is noted that the initial shape of operator member 148 is such that damper plate 130 does not open all the way so that recess 160 will not be isolated from the air passing through the outlet port of the valve. As in the valve assembly of FIG. 2, opening of the damper permits the influx of cold air from a cold source (not shown) adapted to be connected to inlet 120.

Since damper plate 130, when open, does not completely seal recess 160, operator member 148 is exposed to circulating air currents caused by the passage of air over valve seat 124. Because of this arrangement, operator member 148 senses air temperature downstream of the damper plate 130 to control the position thereof. Thus, as the cold incoming air reduces the temperature of the operator member below its critical temperature, the structural changes in the shape memory material reduce its modulus of elasticity whereupon the force of spring 134 acts to stretch the operator member to its distorted shape thereby closing the damper. Additional cold air is consequently precluded from passing through the valve assembly until the sensed temperature of operator member 148 increase once again.

It can therefore be seen that the operation of the valve assembly of FIG. 2 is substantially similar to that of FIG. 4 for regulating the flow of forced cold air except that biasing spring 34 acts upon operator member 48 to compress it against its extended annealed shape in the former embodiment, while biasing spring 134 acts to stretch operator member 148 from its tightly coiled anealed shape in the later embodiment.

A further embodiment of the valve assembly of the present assembly is shown in FIG. 5 wherein parts similar to parts in FIG. 4 are given reference numbers with 100 added thereto.

A valve assembly 216 includes a casing 218 having an inlet 220, an outlet 222 and a generally triangular damper valve seat 224 disposed therebetween and formed upon the inner surface of a lower wall of casing 218. An upper wall of the casing defines an inwardly directed generally triangular recess 260 having an eyelet 262 centrally affixed to an inclined wall portion 264. Recess 260 is constructed to accommodate the upper end of a biasing spring 234 having one end affixed to eyelet 262 and its other end affixed to an eyelet 266 mounted on the upper surface of a damper plate 230. Damper plate 230 is pivotally mounted upon a hinge member 232 and is normally biased to an open position (shown dashed) away from valve seat 224 by spring 234.

Coaxially aligned with and completely surrounding biasing spring 234 is a helical operator member 248 constructed of a material having a temperature-actuated shape memory which has been previously annealed to an extended or loosely coiled shape. The spring force exerted against damper plate 230 by operator member 248 opposes the force exerted by biasing spring 234 and controls the position of the damper in response to the temperature of the operator member.

In the embodiment of FIG. 5, operator member 248 is annealed above its transition temperature such that it has a loosely coiled initial shape and a tightly coiled distorted shape; damper 230 is in a closed position when the operator member has its initial shape.

The operation of the embodiment of FIG. 5 is substantially similar to that of the previously described embodiments; however, the valve assembly in this configuration is adapted to regulate the flow of heated air, or other fluid, from a source (not shown) mounted at the inlet of the valve into a compartment cooperating with the outlet. The outlet compartment may be a room in a house or office building, the interior of a passenger vehicle, or the like.

The operator member 248 of FIG. 5 is mounted in compression while bias spring 234 is mounted in tension so that the forces produced thereby directly oppose each other. In operation, the operator member 248 exhibits a high modulus of elasticity at temperatures above its transition temperature such that the force exerted by tension mounted biasing spring 234 is overcome by the operator member which thus acts to close the damper plate 230 against valve seat 224. As the temperature downstream of the valve assembly cools, the operator member 248 will correspondingly cool until it undergoes the transition to a low modulus of elasticity state. The force exerted by spring biasing member 234 is then sufficient to compress the operator member to its distorted shape and simultaneously open damper plate 230 thereby initiating a flow of warm air through the valve assembly. Warm air continues to flow until the temperature within the compartment as sensed by operator member 248 is above the transition temperature. Consequently, the operator member tries to return to its annealed extended shape whereupon a force of sufficient magnitude is developed to overcome the biasing force and close the damper plate 230 firmly against valve seat 224 preventing further flow from the source of heated air.

The valve assembly of FIG. 5 is thus adapted to regulate the flow of a heated fluid, such as air, in any number of various installations where a flow of such fluid is desired to be responsive to the sensed temperature at the downstream side of the valve.

Figure 6:
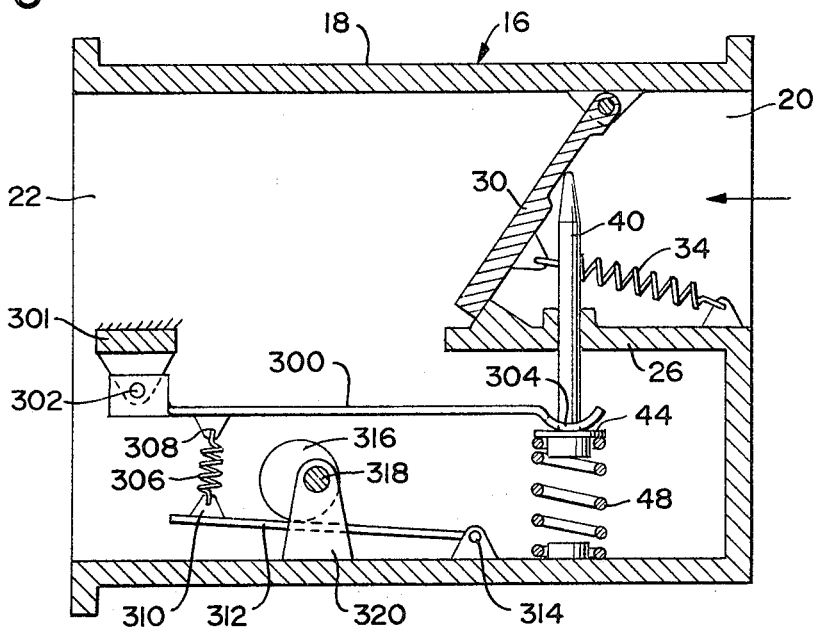
FIG. 6 is a vertical cross-section of a modification of the valve assembly detail of FIG. 2.

Referring now to FIG. 6, a modification of the device of FIG. 2 is illustrated. Parts in FIG. 6 which are identical to parts of the embodiment of FIG. 2 are given identical reference numerals.

The valve assembly of FIG. 6 includes a damper plate 30, a biasing spring 34, a connecting link 40, and an operator member 48 constructed of a material having a temperature-actuated shape memory. As shown, the device of FIG. 6 is substantially identical to that of FIG. 2 with the addition of a mechanism which permits adjustment of the operating temperature of the valve assembly.

The adjustment mechanism includes a movable arm member 300 having one end pivotally mounted to the underside of a flange 301 by a pivot pin 302. The other end of arm member 300 includes a forked arcuate portion 304 adapted to engage the upper surface of the plate 44, formed upon the lower end of connecting link 40, for the transmission of an additional compressive biasing force to the operator member 48. This force is produced by a spring member 306 mounted in tension between an eyelet 308, located on the underside of arm 300 near pivot pin 302, and an eyelet 310 carried upon one end of a lever arm 312. The other end of a lever arm 312 is connected to the lower wall of casing 18 by a hinge 314. A cylindrical cam 316 is mounted for rotation about an off-center shaft 318, which cooperates with a journaled upstanding mounted bracket 320, to position lever arm 312.

In operation, the adjustment mechanism applies a biasing force to the operator member 48 which is in addition to that applied by spring 34; the magnitude of this force is increased or decreased by varying the axial dimension of helical spring 306. As seen in FIG. 6, rotation of cam 316 causes lever arm 312 to move about hinge 314 whereupon eyelet 310 is vertically displaced. The repositioning of eyelet 310 in turn varies the axial dimension of spring 306 to correspondingly vary the magnitude of the downwardly directed force applied through arm 300 to the operator member 48.

While an extensive explanation of the theory behind the adjustment feature of the present invention will not be presented for the sake of brevity, it should be noted that an operator member which has a temperature-actuated shape memory and operates against a fixed load is essentially a fixed temperature device. It has been discovered that by varying the fixed load applied to the operator member, the effective actuating temperature of the material can be made to vary. That is, as the load is increased, the actuating temperature at which the martensitic type transition occurs increases. Similarly, as the load is decreased, the actuating temperature decreases.

For purposes of clarification, temperature with respect to operation of the valve assembly is hereafter referred to as the operating temperature whereas temperature with respect to the martensitic type transformation of the operator material is referred to as the transition temperature.

As in the device of FIG. 2, the operator member 48 in FIG. 6 is annealed above its transition temperature to an extended or loosely coiled shape and then cooled below its transition temperature and installed in operative position within the valve assembly. When the temperature of the operator member is low, its modulus of elasticity is correspondingly low permitting the biasing forces exerted by bias spring 34 and spring member 306 to compress the operator member and close damper plate 30, as illustrated. As the operator member becomes heated, its modulus of elasticity increases to the point where the force produced by the operator member overcomes the forces produced by springs 34 and 306.

If the operating point of the valve assembly is desired to be adjusted, shaft 318 is rotated so as to displace lever arm 312 and correspondingly reposition spring 306 whereupon an increased or decreased bias force, depending on whether spring 306 is elongated or permitted to contract, respectively, by the movement of cam 316, is applied to the operator member. More specifically, as the cam action elongates spring 306 an increased fixed load is applied to operator member 48 to increase the operating temperature of the damper, and similarly, as the cam action allows spring 306 to decrease in length a decreased fixed load is applied to operator member 48 to decrease the operating temperature of the damper.

The operator members illustrated in the above identified embodiments are not meant to be the only shapes, configurations and cross section of operator members that can be utilized with the present invention. Almost any form of operator member can be utilized as long as it is constructed of a material having a shape memory and will deflect with a load, such as a spring.

The operator members for the embodiments above described may be formed by annealing the material in a desired shape in a position that will effect opening of the damper. The annealing step may be performed in the valve assembly or externally thereof. After annealing, which may be accomplished by passing a current through the operator member, a force is applied to the member below its transition temperature; the operator member is then cycled through its distorted and initial shapes a number of times, and the valve assembly is ready for operation.

Inasmuch as the present invention is subject to many variations, modifications and changes in detail, it is intended that all matter contained in the foregoing description or shown in the accompanying drawings shall be interpreted as illustrative and not in a limiting sense.

What is claimed is:

1. A temperature responsive valve assembly comprising a casing having an inlet port and outlet port,
 valve means mounted within said casing and having first and second fluid flow control positions to regulate a flow of fluid therethrough,
 bias means mounted between said valve means and said casing for exerting a force on said valve means,
 actuator means mounted in said casing adjacent said outlet port to apply a force to said valve means opposing the force exerted by said bias means to control the position of said valve means, and
 said actuator means including an operator member constructed of a material having a temperature-actuated shape memory with a non-linear temperature dependent modulus of elasticity within a preselected temperature zone,
 said operator member having an initial shape above a predetermined transition temperature zone, being deformable to a distorted shape by said bias means below said predetermined transition temperature zone and rapidly reverting to said initial shape in non-linear fashion when heated above said predetermined transition temperature zone as a result of said temperature-actuated shape memory whereby said valve means is rapidly moved between first and second fluid flow control positions in response to downstream fluid temperature.

2. The invention as recited in claim 1 wherein said material is an alloy having a composition of 55 percent nickel by weight with the remainder being essentially titanium.

3. The invention as recited in claim 1 wherein said operator member is a coiled spring.

4. The invention as recited in claim 3 wherein said valve means comprises a damper plate pivotally mounted upon said casing.

5. The invention as recited in claim 4 wherein said operator member is maintained in tension by the force of said bias means.

6. The invention as recited in claim 5 wherein said bias means is affixed to one side of said damper plate and said operator member is affixed to the other side thereof.

7. The invention as recited in claim 4 wherein said operator member is maintained in compression under the force of said bias means.

8. The invention as recited in claim 7 wherein said bias means is a coiled spring, and wherein said bias means and said operator member are coaxially mounted between said damper plate and said casing.

9. The invention as recited in claim 7 wherein said valve means further comprises a link member adapted to engage said operator means and said damper plate to transmit the force produced by said operator member to said damper plate.

10. The invention as recited in claim 9 wherein an adjusting means cooperates with said bias means to control the force applied to said operator member whereby the operating temperature of said valve assembly may be adjusted.

11. In a valve assembly for regulating the temperature of fluid within a compartment, the combination comprising
a casing having an inlet and an outlet which is adapted to communicate with the compartment,
valve means mounted within said casing and having first and second fluid flow control positions to control a flow of fluid having a preselected temperature to the compartment,
bias means mounted between said valve means and said casing to constrain said valve means toward said first position,
actuator means adapted to sense the temperature of fluid within the compartment and including an operator member constructed from a material exhibiting a non-linearly varying temperature dependent modulus of elasticity within a preselected temperature zone, and
said actuator means connected with said valve means and adapted to move said valve means against the constraining force of said biasing means as said modulus of elasticity varies whereby the flow of fluid through said valve means rapidly follows sensed temperature variations thereby to accurately regulate the temperature of fluid within the compartment.

12. The invention as recited in claim 11 wherein said operator member is a helical spring mounted in tension and having a tightly coiled initial shape and a loosely coiled deformed shape.

13. The invention as recited in claim 12 wherein said valve means comprises a damper plate pivotally mounted upon said casing, and wherein said helical spring is mounted on one side of said damper plate and said bias means is mounted on the other side thereof.

14. The invention as recited in claim 11 wherein an adjusting means cooperates with said bias means to control the force applied to said operator member whereby the operating temperature of said valve assembly may be adjusted.

15. The invention as recited in claim 14 wherein said adjusting means comprises a load spring adapted to apply a force to said operator member through a lever member pivotally mounted upon said casing.

16. The invention as recited in claim 15 wherein said load spring is mounted in tension between said lever member and a displaceable temperature selector means mounted upon said casing to adjust the force applied by said load spring to said operator member.

17. The invention as recited in claim 11 wherein said operator member is a helical spring mounted in compression and having a loosely coiled initial shape and a tightly coiled deformed shape.

18. The invention as recited in claim 17 wherein said valve means comprises a damper plate hinged upon said casing and movable between open and closed positions.

19. The invention as recited in claim 18 wherein said helical spring is mounted between said damper plate and said casing.

20. The invention as recited in claim 18 wherein said actuator means includes a link member to cooperate with said helical spring and said damper plate for transmitting forces generated by said helical spring to said damper plate.

References Cited
UNITED STATES PATENTS

| | | | |
|---|---|---|---|
| 2,258,324 | 10/1941 | Hans | 236—34 X |
| 2,462,198 | 2/1949 | Johnson | 236—34 X |
| 2,987,138 | 6/1961 | Walton | 55—266 X |
| 3,403,238 | 9/1968 | Buehler et al. | 60—23 X |

MEYER PERLIN, Primary Examiner

W. C. ANDERSON, Assistant Examiner